Patented June 27, 1939

2,163,637

UNITED STATES PATENT OFFICE 2,163,637

PHENOLIC RESIN

Charles A. Thomas, Dayton, Ohio, assignor, by mesne assignments, to Monsanto Chemical Company, a corporation of Delaware No Drawing. Application July 31, 1935, Serial No. 34,061

8 Claims. (Cl. 260—30)

This invention pertains to a new artificial resin derived from a phenolic-aldehyde oil-soluble resin and a petroleum hydrocarbon resin and to coating and similar compositions produced therefrom.

One object of this invention is to provide a method of enhancing the properties of the so-called oil soluble phenol-aldehyde resins by treatment with a resin derived from a cracked petroleum distillate by polymerization with metallic halides or other Friedel-Crafts catalysts.

Another object of the invention is to provide coating materials made from hydrocarbon resins, said coating materials possessing greater durability, light stability and other advantages not heretofore available in such materials. Other objects and advantages of the invention will be apparent from the following description.

Resins prepared from cracked petroleum distillates by treatment with metallic halides or other Friedel-Crafts catalysts, as described in the patent to Charles A. Thomas and Carroll A. Hochwalt, No. 1,836,629, of December 15, 1931, are characterized by their neutrality, resistance to darkening under the action of light, extreme solubility in vegetable oils and petroleum and coal-tar solvents, and great resistance to the action of alkalies.

I have now found that the above designated resins combine with the oil-soluble type phenolic resins, to give products whose properties are still further improved. The durability, that is, the resistance to atmospheric weathering of the hydrocarbon resins is materially increased. Films deposited from coating materials made from the prepared resins of this invention withstand longer periods of exposure to sunlight, air, rain, sea water, and alkalies before failure becomes evident than the original hydrocarbon resins.

Furthermore, it has been found that the resins prepared from the oil-soluble substituted phenol-aldehyde resins and hydrocarbon resins show remarkable inhibition of gas checking of oil-resin combinations. It is well-known in the art that when films of coating materials containing China-wood oil (tung oil) or oiticica oil and various resins, both natural and synthetic, are allowed to dry in atmospheres containing nitrogen oxides or fumes from flames or atmospheres from electric discharges, the films instead of being clear and smooth are cloudy and checked. The combination of the soluble substituted phenolic resins with the hydrocarbon resins has the remarkable property of inhibiting checking to a remarkable extent.

Phenolic resins are characterized by their susceptibility to darkening under light, a serious disadvantage in some cases. It was to be expected that the addition of phenolic resins to a hydrocarbon resin would be accompanied by a decreased resistance to light of the thus prepared resin, but on the contrary the prepared resin exhibits substantially the same resistance to darkening under light that the original hydrocarbon resin possessed. On the other hand, it was observed that the addition of the hydrocarbon resin to larger proportions of the phenolic resin serves to increase the resistance to darkening of the phenolic resin. Furthermore, and very important is the discovery that, whereas phenolic resins are not soluble in petroleum hydrocarbon solvents, the prepared resins of this invention are soluble therein.

Whether the combination of the phenolic resin with the hydrocarbon resins takes place by a chemical union, that is, whether the unsaturated bonds of the hydrocarbon resin combine by addition in some manner with the phenolic resin structure, either in some vacant position in the benzene rings of the original phenols, or in some other position, or whether the combination is merely a physical one, has not been possible to determine incontrovertibly. There appears to be no great difference between prepared resins resulting from the fusion of a mixture of a phenolic resin and a hydrocarbon resin, or solutions thereof, and that resulting from fusion of the same constituents in the presence of a small amount of catalytic substances such as potassium hydroxide, phosphoric acid, sulphuric acid, and aluminum chloride, nevertheless I prefer the former. Alternatively the product may be made by treating a solution of a phenolic resin together with a cracked petroleum distillate with aluminum chloride. Undoubtedly, in the latter case, the phenolic resin enters into reaction with the unsaturated hydrocarbons of the cracked petroleum distillate in the presence of the aluminum chloride, yet the product resulting exhibits the same general properties which characterize the prepared resin formed in simple fusion of the phenolic resin with the hydrocarbon resin. The similarity of product in each case is strongly indicative that if a reaction takes place in one case, as it undoubtedly does, it occurs in the other case. Be that as it may, the invention is not to be limited by any theory suggested to explain the remarkable results attained by the practice of the invention.

The types of hydrocarbons which are suitable for use in the practice of this invention or for the production of unsaturated hydrocarbon resins for the practice of this invention include olefins, diolefins, aromatic hydrocarbons, alkylated hydrocarbons, and terpenes, all of which, with the possible exception of terpenes, occur to a greater or lesser extent in cracked hydrocarbon distillates. The reactions by which unsaturated hydrocarbon resins are formed from these hydrocarbons by treatment with Friedel-Crafts catalysts are complex, but include the condensation or combination of a member of one class of the hydrocarbons mentioned with a member of another class, accompanied by polymerization of the individual unsaturated hydrocarbons and/or polymerization of the condensed hydrocarbon products. The hydrocarbon resins used in the invention can be subjected to subsequent treatments such as a treatment with superheated steam, decolorizing treatments, or similar procedures to improve their properties. In general these resins are unsaturated, having an iodine number of from 100 to 225, of which I prefer those within the range of approximately 125 to 200.

The oil-soluble phenolic resins suitable for use in the practice of the invention are the so-called 100% phenolic resins, such as result from the condensation of paraphenylphenol or para-tertiary-amylphenol with formaldehyde, the condensation of para-tertiary-butylphenol with formaldehyde, those designated in the trade as Bakelite BR-254 and BR-820 and the like, and resins produced from the condensation of formaldehyde with a phenol resulting from the condensation of phenol and a cracked hydrocarbon distillate. These resins are comprehended in the term "phenolic resins" as used in this specification.

In combining the hydrocarbon resin with the phenolic resin to form the prepared resin of this invention a number of methods may be used, of which the following are characteristic:

1. Fusion of the hydrocarbon resin with the phenolic resin without any catalyst.

2. Fusion of the hydrocarbon resin with the phenolic resin in the presence of acidic, basic, or condensation and addition catalysts such as phosphoric acid, sodium hydroxide, aluminum chloride and the like.

3. Treatment of a cracked hydrocarbon distillate in which the phenolic resin is dissolved in the presence of a metallic halide or other Friedel-Crafts catalyst.

4. Treatment of a fused mixture of a phenol giving rise to oil-soluble resins and a hydrocarbon resin with formaldehyde in the presence of acidic or basic catalysts under atmospheric or increased pressures.

5. Solution of the hydrocarbon resin and the phenolic resin in a solvent and subsequent evaporation of the solvent.

6. In the manufacture of coating compositions in which the temperature is raised beyond the melting points of the resins, the resins may be added individually, the combination taking place in solution during the heating.

7. Treatment of a mixture of phenol ($C_6H_5OH$) or a phenol giving rise to an oil-soluble resin (such as para-tertiary-amylphenol), a cracked hydrocarbon distillate, formaldehyde gas or solution, paraformaldehyde or trioxymethylene, and condensation catalysts such as aluminum chloride (in the absence of water) and sulphuric acid under pressure. In this case, depending upon the type of cracked hydrocarbon distillate used, phenol ($C_6H_5OH$) reacts to give a substituted phenol capable of yielding oil-soluble resins by condensation with formaldehyde.

The proportions of phenolic resin and of hydrocarbon resin used in the manufacture of the prepared resin can be varied over wide ranges. The definite quantity of a particular hydrocarbon resin to use with a definite quantity of a particular phenolic resin is dependent upon the characteristics desired in the prepared resin. These quantities can be determined only by test, since the properties of the prepared resin cannot be foretold from the properties of the individual phenolic resin and hydrocarbon resin.

The prepared resins of this invention can be used in the production of varnishes in the known ways. Furthermore, the prepared resins combine with castor oil, tung oil, and similar drying and non-drying oils to give new resinous products which, when dissolved in varnish solvents, deposit tough, substantially waterproof and extremely flexible films, such procedures being described in the patents of Charles A. Thomas and Carroll A. Hochwalt, Nos. 2,023,495; 2,039,364; 2,039,365; 2,039,366 and 2,039,367.

As procedures illustrative of typical methods of practicing the invention and of the advantages accruing from such practice, the following are cited:

Example 1

A resin was prepared from a condensate resulting from kerosene cracked at 875° C. with a time of contact of 0.168 second; the fractions of the cracked kerosene condensate used had a boiling range from 35° to 225° C. To 808 cc. of the distillate of this boiling range was added a solution of 50 g. of Bakelite BR-254 in 90 cc. toluene. The mixture was agitated rapidly with a stirrer and 15 grams of anhydrous aluminum chloride were added cautiously, maintaining the temperature below about 30° C. by cooling. After agitating for 1 hour, 60 cc. of an alcoholic ammonia solution containing 24 cc. of aqueous ammonia solution of sp. gr. 0.90 and 36 cc. of 95% alcohol were cautiously added and the mixture was filtered. The clear filtrate was evaporated until hard brittle resin remained as residue. This resin was called and is referred to subsequently as the prepared resin.

The same condensate was treated in exactly the same manner without the addition of the phenolic resin, this being subsequently referred to as the original resin.

In comparison, the melting points of the original and prepared resins were substantially the same (115° C.) whereas the acid number of the prepared resin was slightly higher.

Varnishes were prepared from both resins by heating 20 grams of the resin with 60 cc. of China-wood oil to a temperature of 560° F. and then allowing the mass to cool to 500° F. and maintaining it at that temperature until a small portion removed from the main mass pulled or "roped" on drawing it out between the fingers. The mass was then thinned with 60 cc. of petroleum naphtha.

Test panels were coated with each of these varnishes. The water resistance of films of both the original and prepared resin were approximately equal and satisfactory. On drying films deposited from both varnishes in atmospheres conducive to gas checking, the original-resin varnish checked whereas the prepared-resin varnish dried to a smooth glossy film.

In every test prepared resin was equal to or superior to the original resin. In addition, whereas the phenolic resin was insoluble in petroleum spirits solvents, the prepared resin was completely soluble.

Example 2

A hydrocarbon resin was prepared from 5000 cc. of a cracked hydrocarbon distillate rich in diolefins similar to that used in Example 1, by adding in small portions with agitation and cooling, 225 grams of anhydrous aluminum chloride, maintaining the temperature below about 30° C. After all the aluminum chloride had been added the mass was agitated for an additional hour. To this mass were then added cautiously, with stirring, 900 cc. of an alcoholic ammonia solution prepared by adding 400 cc. of aqueous ammonia solution of sp. gr. 0.90 to 600 cc. of 95% alcohol. The precipitate formed was removed by filtration and the filtrate was evaporated until hard, brittle resin remained. There were obtained 2.1 pounds (953 grams) of hard, brittle, clear resin.

The yield of resin varies with the individual character of the cracked hydrocarbon distillate used, but, in general, will correspond to from 1.5 to 2.5 or more pounds per gallon of distillate used. In general, highest yields accrue from the use of distillates rich in aliphatic olefins and diolefins.

To 3 oz. of the resin prepared above were added 10 grams of an oil-soluble 100% phenolic resin known in the industry as Bakelite BR–254, and 9 oz. by weight of China-wood oil. This mass was processed at 550° F. by the method well known to the varnish art, whereupon 12 oz. by weight of mineral spirits thinner were added and 2% by weight of the total varnish of a lead, cobalt and manganese resinate drier containing 1% by weight of lead, 0.85% cobalt and 0.008% manganese.

Test panels of fir wood were treated with three coats of this varnish and subjected to exposure on a roof at Dayton, Ohio. The results of this exposure test are reported following Example 7.

Example 3

A varnish without the hydrocarbon resin was prepared in exactly the same manner as in Example 2. This varnish contained 4 oz. of Bakelite BR–254, 12 oz. by weight of China-wood oil, 12 oz. mineral spirits and a proportionate amount of the same drier used in Example 2, the processing being conducted to 510° F.

Test panels of fir wood were coated with three coats of this varnish and exposed as in Example 2.

Example 4

A varnish was prepared with 3 oz. of the hydrocarbon resin used in Example 2, 20 grams of Bakelite BR–254 resin, 9 oz. China-wood oil, 9 oz. mineral spirits and 2% by weight of the same drier used in Example 2, processing being conducted to 560° F.

Test panels of fir wood were coated with this varnish and exposed as before. (Example 2.)

Example 5

A varnish with no phenolic resin prepared by processing to 550° F. as in Example 2, 4 oz. of the same hydrocarbon resin, 12 oz. China-wood oil, 10 oz. mineral spirits and 2% by weight of the same drier was coated on fir wood test panels and exposed.

Example 6

A varnish was prepared by processing to 450° F. as in Example 2, 10 oz. of the hydrocarbon resin therein prepared, 10 oz. of the phenolic resin (Bakelite BR–254), and 60 oz. by weight of China-wood oil. This mass was held at 450° F. for about 20 minutes, whereupon 60 oz. of mineral spirits thinner and 2% by weight of the total varnish of the same drier were added. Test panels were prepared and exposed as before.

Example 7

A varnish of the same formulation as Example 6 was prepared without the addition of the hydrocarbon resin; by processing to 450° F. 20 oz. of Bakelite BR–254 resin, 60 oz. China-wood oil, 60 oz. mineral spirits and 2% of the total of the same drier. Test panels of fir wood were coated and exposed as before.

Exposure tests

The varnish in Examples 2 to 7 which were coated on fir wood panels and exposed to the atmosphere under identical conditions at Dayton, Ohio, were examined frequently. In tests of this nature it is difficult to describe the exact differences of such panels but such tests are reliable and indicative. All of the tests were conducted to a point at which weathering was perceptible.

The varnishes of Examples 2, 3, 4 and 5 are approximately comparable; the first panel to fail was that containing hydrocarbon resin with no phenolic resin; the second group of failures was the varnish containing a small proportion of phenolic resin. From the appearance there was considerably more yellowing observable in each case on the panel coated with the varnish prepared from phenolic resin without any hydrocarbon resin.

The varnishes in Examples 6 and 7 are also comparable. That varnish containing exclusively phenolic resin was slightly better in durability than that with the hydrocarbon resin but discolored.

Although the examples described above constitute preferred embodiments of the invention it is to be understood that the invention is not to be limited thereto, or to any theory concerning the mechanism of such actions, except where such limitations are comprehended in the claims.

What I claim is:

1. A coating composition comprising the reaction product of a preformed oil-soluble 100% phenolic resinous condensation product of a substituted phenol and an aldehyde, which condensation product is insoluble in mineral spirits, and a preformed hydrocarbon resin obtained by polymerization of a cracked petroleum distillate, said hydrocarbon resin being soluble in mineral spirits and benzene and insoluble in alcohol and acetone, the relative amount of the two resins in the reaction product being such as to result in a reaction product which is soluble in mineral spirits.

2. A coating composition comprising a solvent consisting essentially of mineral spirits and a film-forming composition dissolved therein obtained by reacting a preformed oil-soluble 100% phenolic resinous condensation product of a substituted phenol and an aldehyde, a drying oil and a preformed hydrocarbon resin obtained by polymerization of a cracked petroleum distillate, said hydrocarbon resin being soluble in mineral spirits and benzene and insoluble in alcohol and acetone.

3. A coating composition comprising a solvent consisting essentially of mineral spirits and a film-forming composition dissolved therein obtained by reacting a preformed oil-soluble 100% phenolic resinous condensation product of a substituted phenol and an aldehyde, a drying oil and a preformed hydrocarbon resin obtained by polymerization of a cracked petroleum distillate, said hydrocarbon resin being soluble in mineral spirits and benzene, and insoluble in alcohol and acetone, the amount of phenolic resinous condensation product as compared to hydrocarbon resin being at least sufficient to obviate gas checking.

4. A coating composition comprising a solvent consisting essentially of mineral spirits and a film-forming composition dissolved therein obtained by reacting a preformed oil-soluble 100% phenolic resinous condensation product of a substituted phenol and an aldehyde, a drying oil and a preformed hydrocarbon resin obtained by polymerization of a cracked petroleum distillate, said hydrocarbon resin being soluble in mineral spirits and benzene and insoluble in alcohol and acetone, the amount of hydrocarbon resin present as compared to the amount of phenolic resinous condensation product being sufficient to eliminate yellowing substantially such as occurs normally with a phenolic resinous condensation product.

5. The coating composition as defined in claim 1 and further characterized in that the hydrocarbon resin has an iodine value of not substantially less than 100, or substantially in excess of 225.

6. The coating composition as defined in claim 2 and further characterized in that the hydrocarbon resin has an iodine value of not substantially less than 100, or substantially in excess of 225.

7. The coating composition as defined in claim 3 and further characterized in that the hydrocarbon resin has an iodine value of not substantially less than 100, or substantially in excess of 225.

8. The coating composition as defined in claim 4 and further characterized in that the hydrocarbon resin has an iodine value of not substantially less than 100, or substantially in excess of 225.

CHARLES A. THOMAS.